US 7,606,792 B2

(12) United States Patent
Cunningham et al.

(10) Patent No.: US 7,606,792 B2
(45) Date of Patent: Oct. 20, 2009

(54) SYSTEM AND METHOD FOR EFFICIENT EVALUATION OF A QUERY THAT INVOKES A TABLE VALUED FUNCTION

(75) Inventors: Conor Cunningham, Redmond, WA (US); Beysim Sezgin, Redmond, WA (US); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 10/881,474

(22) Filed: Jun. 30, 2004

(65) Prior Publication Data

US 2005/0209988 A1 Sep. 22, 2005

Related U.S. Application Data

(60) Provisional application No. 60/554,639, filed on Mar. 19, 2004.

(51) Int. Cl.
*G06F 7/00* (2006.01)
*G06F 17/00* (2006.01)

(52) U.S. Cl. .................. 707/3; 707/1; 707/2; 707/5; 707/6; 707/9; 707/10; 707/100; 707/102; 707/104.1; 707/200

(58) Field of Classification Search .................. None
See application file for complete search history.

(56) References Cited

U.S. PATENT DOCUMENTS

| | | | | |
|---|---|---|---|---|
| 4,664,496 A | * | 5/1987 | Shinoda et al. | 396/169 |
| 5,544,355 A | | 8/1996 | Chaudhuri et al. | |
| 5,822,750 A | * | 10/1998 | Jou et al. | 707/2 |
| 5,864,862 A | * | 1/1999 | Kriens et al. | 707/103 R |
| 5,875,334 A | * | 2/1999 | Chow et al. | 717/141 |
| 6,282,581 B1 | * | 8/2001 | Moore et al. | 719/316 |
| 6,351,742 B1 | * | 2/2002 | Agarwal et al. | 707/3 |
| 6,360,214 B1 | * | 3/2002 | Ellis et al. | 707/2 |
| 6,370,522 B1 | * | 4/2002 | Agarwal et al. | 707/2 |
| 6,401,083 B1 | * | 6/2002 | Agarwal et al. | 707/2 |
| 6,460,043 B1 | * | 10/2002 | Tabbara et al. | 707/100 |
| 6,496,819 B1 | * | 12/2002 | Bello et al. | 707/3 |
| 6,496,833 B1 | * | 12/2002 | Goldberg et al. | 707/102 |
| 6,505,189 B1 | * | 1/2003 | On Au et al. | 707/2 |
| 6,567,802 B1 | * | 5/2003 | Popa et al. | 707/3 |
| 6,567,819 B1 | * | 5/2003 | Cheng et al. | 707/103 R |
| 6,594,651 B2 | | 7/2003 | Kabra et al. | |
| 6,609,123 B1 | * | 8/2003 | Cazemier et al. | 707/4 |
| 6,738,968 B1 | | 5/2004 | Bosworth et al. | 717/157 |

(Continued)

OTHER PUBLICATIONS

SQL Tuning for Oracle White Paper by Marty Weber. Copyright 2001. Retrieved from google.com on Jan. 26, 2007.*

(Continued)

*Primary Examiner*—Hosian T Alam
*Assistant Examiner*—Usmaan Saeed
(74) *Attorney, Agent, or Firm*—Woodcock Washburn LLP

(57) ABSTRACT

The present invention describes an efficient and fast framework for implementing table-valued functions (TVF's) in a relational database server. The framework provides desirable extensibility properties and has the ability to minimize performance degradations by integrating tightly with the optimization infrastructure in a query processor. The present invention also enables a managed execution environment (MEE) such as the Common-Language-Runtime (CLR), to efficiently and dynamically extend the logic of the database engine with user-supplied code.

27 Claims, 7 Drawing Sheets

U.S. PATENT DOCUMENTS

| | | | |
|---|---|---|---|
| 6,778,977 B1 * | 8/2004 | Avadhanam et al. | 707/2 |
| 6,823,329 B2 * | 11/2004 | Kirk et al. | 707/2 |
| 7,103,590 B1 * | 9/2006 | Murthy et al. | 707/3 |
| 7,302,422 B2 * | 11/2007 | Bossman et al. | 707/2 |
| 7,319,945 B1 * | 1/2008 | Shapiro et al. | 703/11 |
| 7,330,848 B2 * | 2/2008 | Chaudhuri et al. | 707/3 |
| 7,506,329 B1 * | 3/2009 | Boucher | 717/151 |
| 2003/0172368 A1 * | 9/2003 | Alumbaugh et al. | 717/106 |
| 2004/0236762 A1 * | 11/2004 | Chaudhuri et al. | 707/100 |
| 2005/0120000 A1 * | 6/2005 | Ziauddin et al. | 707/3 |
| 2005/0177579 A1 * | 8/2005 | Blakeley et al. | 707/100 |
| 2005/0204340 A1 * | 9/2005 | Ruminer et al. | 717/123 |

OTHER PUBLICATIONS

Chapter 5: Gathering and Analyzing Information. Oracle Enterprise Manager Database Tuning with Oracle Tuning Pack. Release 9.0.1 Part No. A86647-01. Copyright 2001. Retrieved from Oracle Website on Jan. 26, 2007.*

Chapter 14: The Query Optimizer. Oracle Database Performance Tuning Guide. 10g Release 1 (10.1). Part No. B10752-01. Retrieved from Oracle Website Jan. 26, 2007.*

Eric Brown. Yukon Basics. XML, T-SQL, and the CLR Create a New World of Database Programming. MSDN Magazine. Feb. 2004.*

Michael Otey. YukonXML. Chapter 4- New Development Features. Mar. 1, 2004.*

Steven Pratschner. Microsoft.NET: Implement a Custom Common Language Runtime Host for Your Managed App. MSDN Magazine. Mar. 2001.*

M. Jaedicke: Parallel Object-Relational Query Processing. Chapter 7: Implementation of UDTO. Springer-Verlag Berlin Heidelberg 2001.*

Qiong Luo and Wenwei Xue. Template- Based Caching for Tabel-Valued Functions. Springer-Verlag Berlin Heidelberg 2004.*

PL?SQL Subprograms. User's Guide and Reference. Release 2 (9.2). Part No. A96624-01. Oracle Website copyright 2002.*

Reducing Dependencies in .Net Development. By Scott Allen. Dr. Dobb's Journal Jan 1, 2002 URL:http://www.ddj.com/windows/184404942.*

By A. Somani, D. Choy, and J. C. Kleewein Bringing together content and data management systems: Challenges and opportunities. vol. 41, No. 4, 2002. IBM Systems.*

Dessloch, S. et al., "Integrating SQL Databases with Content-Specific Search Engines", Proceedings of the International Conference on Very Large Data Bases, Aug. 26-29, 1997, 528-537, XP009061586.

Blakeley, J.A. et al., "Microsoft Universal Data Access Platform", *SIGMOD*, 1998, 502-503.

Fuhr, N. et al., "A Probabilistic Relational Algebra for the Integration of Information Retrieval and Database Systems", *ACM Transactions on Information Systems*, 1997, 15(1), 32-66.

Kennedy, A. et al., "Design and Implementation of Generics for the .Net Common Language Runtime", *PLDI*, 2001, 1-12.

Nakano, R., "Translation with Optimization from Relational Calculus to Relational Algebra Having Aggregate Functions", *ACM Transactions on Database Systems*, 1990, 15(4), 518-557.

* cited by examiner

SYSTEM AND METHOD FOR EFFICIENT EVALUATION OF A QUERY THAT INVOKES A TABLE VALUED FUNCTION

CROSS REFERENCE TO RELATED APPLICATION

This application claims priority under 35 U.S.C. § 119 (e) from the following U.S. provisional application filed on Mar. 19, 2004: Ser. No. 60/554,639, entitled "An Efficient Table Valued Function Framework" The above-listed U.S. provisional application is incorporated by reference herein, in its entirety, for all purposes.

FIELD OF THE INVENTION

The present invention relates to the field of data retrieval and manipulation, and, more specifically, to queries that invoke a table valued function to provide results.

BACKGROUND OF THE INVENTION

Relational database servers such as, for example, SQL™ Server from MICROSOFT Corp. of Redmond, Wash., perform a variety of complex calculations to retrieve and manipulate data. Such complex calculations are often not possible using traditional structured query language (SQL) or other relational operators such as GROUP BY, WHERE, etc. A table-valued-function (TVF) can solve this problem by providing a mechanism to introduce special logic into a query operation tree. The TVF class of functions allows scalar arguments as input and produces a series of rows as output. Special logic can be inserted in TVF functions to perform special transformations not supported by traditional relational operators.

Efficient evaluation of TVF's is difficult. These functions often do not have predictable performance behavior since they can contain arbitrary procedural code. This code can include complex logic that calls an external component, possibly on a remote machine. Since query optimizers often use cost estimation models to pick efficient execution strategies, TVF's may pose difficulties with respect to optimization as their performance is hard to predict. Furthermore, since TVF's are used to arbitrarily extend database systems, it is difficult to build a single cost estimation that covers all possible forms of TVF extensibility. Additionally, users who implement TVF's often have limited knowledge of the internals of a query processor. Such limited knowledge makes it difficult to supply accurate and trustable information about the relative execution cost of a function compared to existing internal operations.

Another difficulty with respect to evaluation of TVF's is that some TVF implementations require the result of the TVF be pre-materialized in, for example, a temporary table, before the execution of the remainder of the query. This pre-materialization requires a slow spooling of query results and also limits the flexibility of the TVF by requiring that inputs to the TVF be known before any other portion of the query can be executed. This restriction is not desirable because it is often advantageous to supply a portion of the query such as, for example, a column in a table, as a parameter to the TVF invocation.

As a result of the difficulties set forth above, users of TVF's in conventional relational database systems have had to accept sub-par performance and limited capability as the price of TVF extensibility. Thus, there is a need in the art for systems and methods for efficiently evaluating a query that invokes a TVF. The present invention satisfies these and other needs.

SUMMARY OF THE INVENTION

The present invention describes an efficient and fast framework for implementing table-valued functions (TVF's) in a relational database server. The framework provides desirable extensibility properties and has the ability to minimize performance degradations by integrating tightly with the optimization infrastructure in a query processor. The present invention also enables managed execution environments, such as the Common-Language-Runtime (CLR), to efficiently and dynamically extend the logic of the database engine with user-supplied code.

According to an aspect of the present invention, the TVF framework provides a level of abstraction from the query processor. When an incoming query that invokes a TVF is received at the query processor, a request is generated for an information class that describes the capabilities of the TVF. The information class is then queried with a set of binding questions to provide information that is used for query binding. The information class is also queried with a set of optimization questions to provide information that is used for query optimization. During query execution, the information class is used to generate an execution class, which returns a set of output rows to the query processor in accordance with the TVF.

According to another aspect of the invention, the TVF framework set forth above may be extended to a managed execution environment (MEE). An interface such as a text editor is provided within the MEE that enables the user to create a class that defines the capabilities of the TVF. The class is then compiled into binary file and submitted to the database server. At the database server, the binary file may be used to generate an information class that can be implemented within the TVF framework.

According to another aspect of the invention, relational operations such as, for example, filter, projection, and grouping operations may be pushed into the execution of a TVF. Such relational operation "push down" improves efficiency by enabling the TVF to be evaluated in accordance with the scope of the relational operation.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
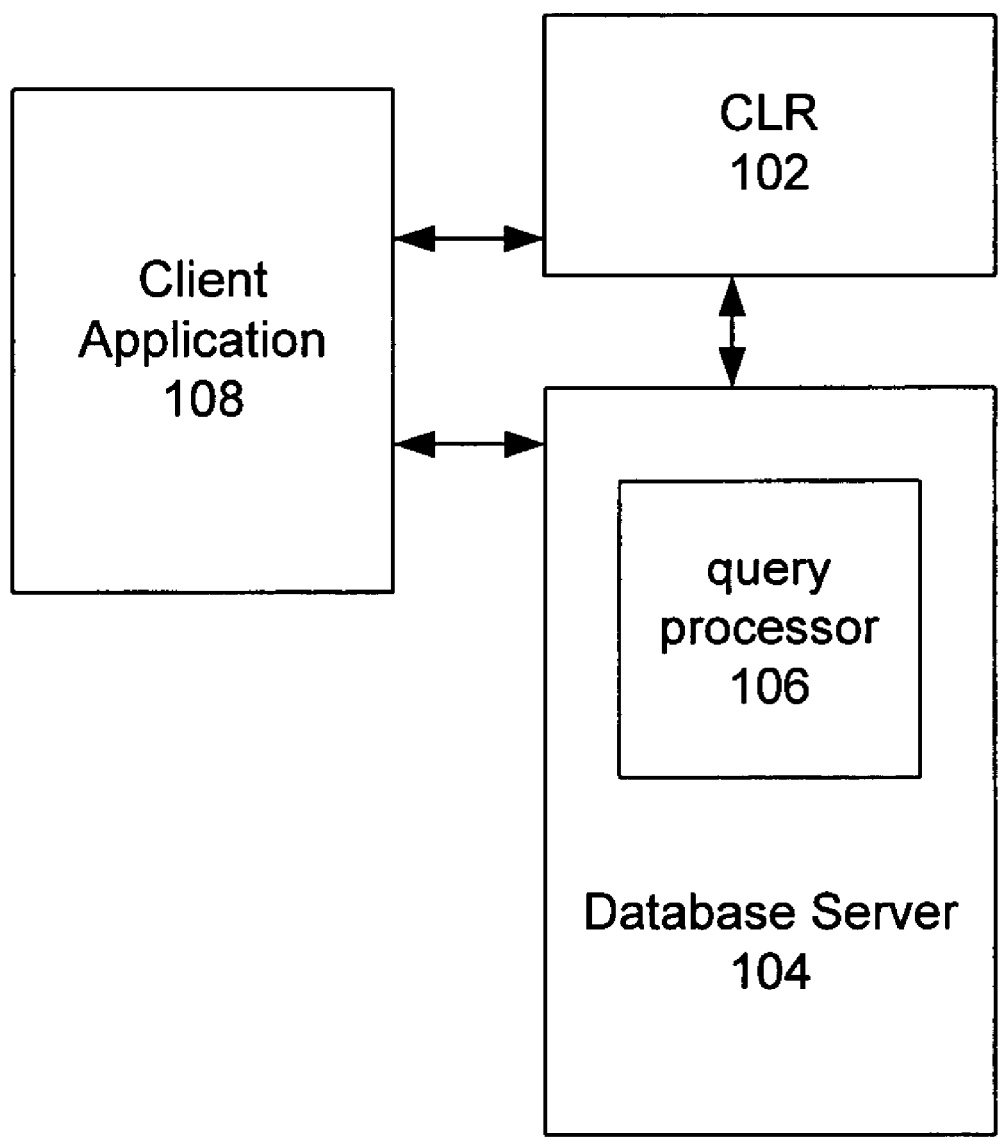
FIG. 1 is a block diagram of a data retrieval and manipulation system in accordance with the present invention.

A block diagram of an exemplary data retrieval and manipulation system in accordance with the present invention is shown in FIG. 1. Generally, client application 108 enables queries to be generated and submitted to database server 104 for execution at database server 104. Database server 104 provides access to one or more underlying data stores, which store data in relational form such as in tables organized into rows and columns. Database server 104 includes a query processor 106, which generally executes the incoming query on the underlying data stores. When the incoming query is received, query processor 106 typically performs query binding and query optimization procedures on the query prior to execution.

As also shown in FIG. 1, database server 104 may (although need not necessarily) operate in connection with a managed execution environment (MEE) 102. MEE 102 may be, for example, a common language runtime (CLR) environment. The MEE 102 generally provides an execution environment for managed code. Accordingly, the MEE 102 may provide various functions and services required for program execution, including, for example, just-in-time (JIT) compilation, allocating and managing memory, enforcing type safety, exception handling, thread management and security. Furthermore, in addition to traditional relational query languages such as structured query language (SQL), the MEE 102 enables tasks to be performed in full-fledged programming languages such as, for example, Visual Basic and C#. Such full-fledged programming languages may support features such as arrays, collections, for each loops, bit shifting and classes. Thus, developers may leverage the integration of MEE 102 with database server 104 to write code that has more complex logic and is better suited for computational tasks than traditional relational query languages.

Execution of queries at database server 104 often requires complex operations which are not supported by existing relational query language operators. To perform such operations, query processor 106 may invoke one or more table valued functions (TVF's). Generally, a TVF provides a mechanism to introduce special logic into a query operation tree. A TVF typically receives scalar arguments as input and produces a series of rows as output. Special logic can be inserted into a TVF to perform special transformations not supported by traditional relational operators.

The present invention provides a framework for executing a query that invokes a TVF. Importantly, the framework abstracts the user code from the query processor 106. The framework may be used in connection with individual TVF's or classes of TVF's such as, for example, MEE-based TVF's. Each such TVF or TVF class implements logic to support operations such as binding output columns, understanding parameters, and instantiating run-time logic. Additionally, abstract questions about the capabilities of the TVF are also supplied through the framework, and the query processor 106 explores alternatives that are consistent with the behavioral characteristics described by these abstract capabilities in the framework. For example, a TVF may always return rows in sorted order. If this is described to the framework, the query processor 106 can leverage this information during plan generation. For example, sort operations in other portions of a query tree may be avoided.

Figure 2:
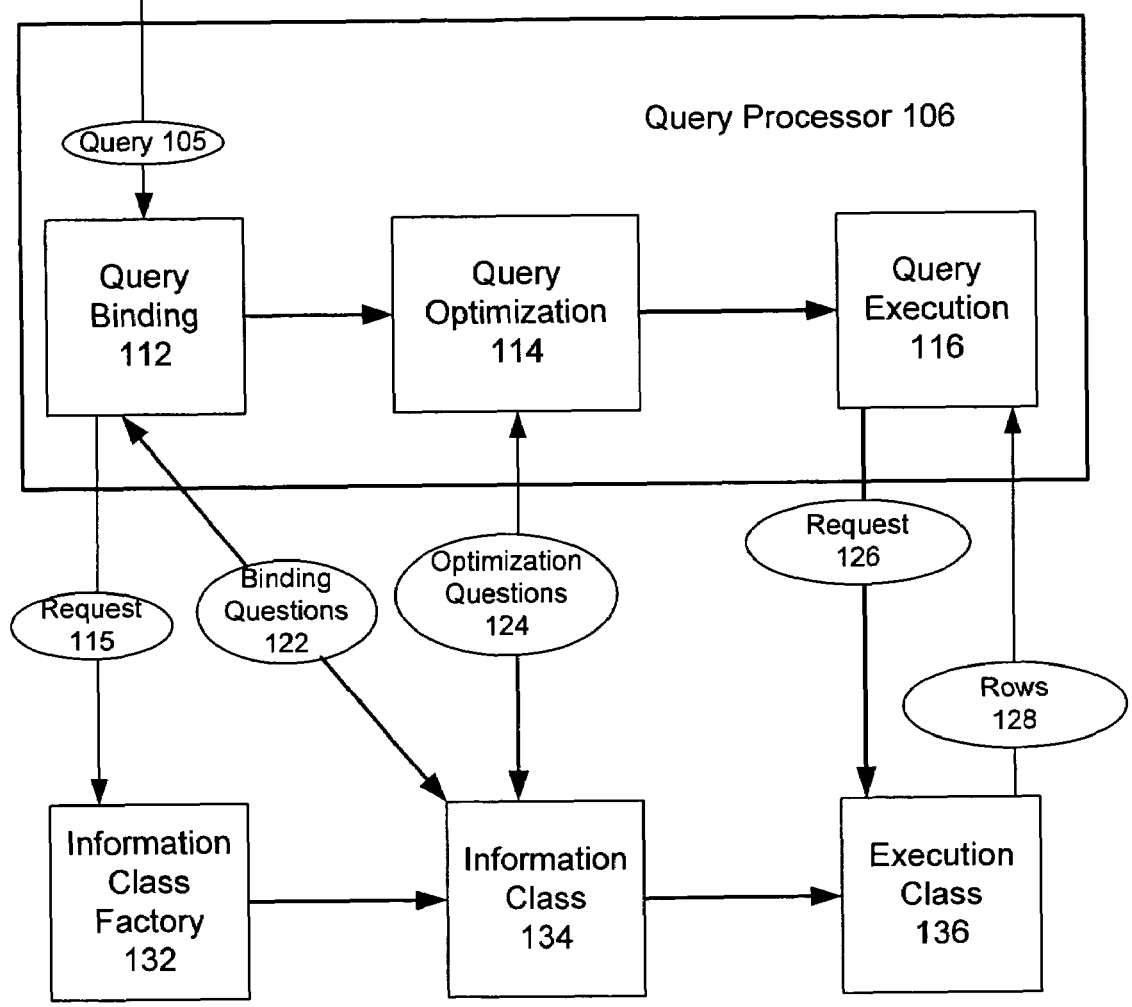
FIG. 2 is a block diagram of an exemplary TVF framework in accordance with the present invention.

A block diagram of an exemplary TVF framework in accordance with the present invention is shown in FIG. 2. Generally, when receiving an incoming query 105, query processor 106 performs query binding process 112 and query optimization process 114. Query processor 106 then executes query 116 in accordance with binding 112 and optimization 114. When incoming query 105 invokes a TVF, information class factory 132 generates an information class 134 that describes the capabilities of the TVF. To provide information for binding 112, the information class 134 is queried with a number of binding questions 122. Also, to provide information for optimization 114, the information class 134 is queried with a number of optimization questions 124. Finally, during execution 116, the information class 134 is used to generate an execution class 136, which provides output rows to query processor 106 in accordance with the invoked TVF.

Figure 3:
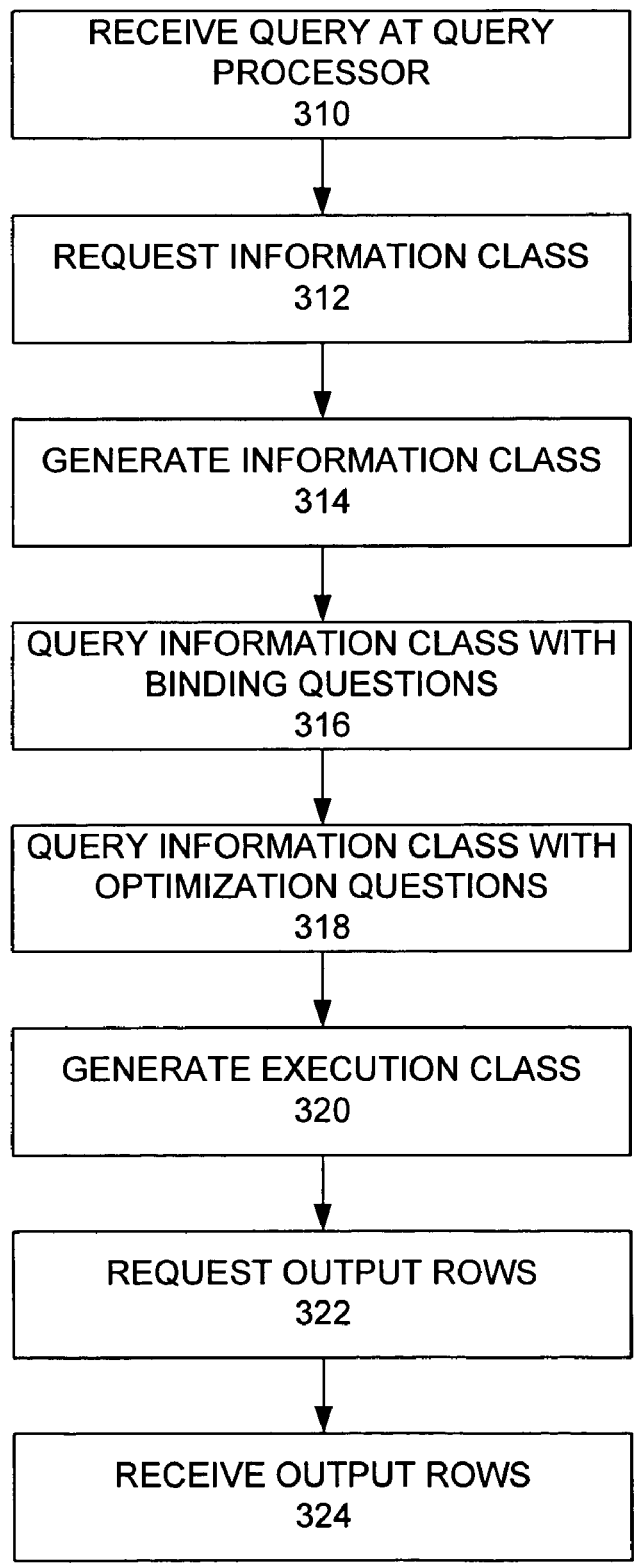
FIG. 3 is a flowchart of an exemplary method for query evaluation in accordance with the present invention.

The framework shown in FIG. 2 may be implemented using the exemplary query evaluation method depicted in FIG. 3, which will now be described in detail. At act 310, incoming query 105 is received at query processor 106. If the incoming query 105 invokes a TVF, then, at act 312, query processor 106 sends a request 115 to information class factory 132 for a corresponding information class 134. At act 314, information class factory 132 generates the requested information class 134. The information class 134 may be implemented as a class in, for example, C++ deriving from a generic base class or some equivalent construct in another language. The key property is that the information class 134 is generated as an abstraction point where the query processor 106 has a level of indirection to the specific instance of the object it is calling.

At act 316, as part of binding 112, query processor 106 queries the information class 134 with a set of binding questions 122. Exemplary binding questions 122 may request information such as, for example, a number of columns that will be returned during query execution, types of columns, and names of the columns. Exemplary binding questions 122 may also inquire whether the TVF is deterministic or accesses external data sources.

At act 318, as part of optimization 114, query processor 106 queries the information class 134 with a set of optimization questions 124. Exemplary optimization questions 124 may include, for example, whether rows are grouped on any set of columns, whether any columns make up a unique key, whether the TVF is deterministic or accesses external data sources. Exemplary optimization questions 124 may also request statistical information about the results of the function. Such statistical information may include, for example, the number of rows that will be returned for each invocation or for each range of parameter values, the number of duplicate values that will be returned for each column or set of columns, and histograms describing the distribution of values that will be returned from the function.

At act 320, as part of execution 116, the information class 134 is used to generate an execution class 136. At act 322, query processor sends to execution class 136 a request 126 for the set of TVF output rows 128, and, at act 324, execution class 136 returns the requested output rows 128. Thus, the framework of the present invention provides a level of abstraction whereby, when a TVF is invoked, information about the TVF may be supplied to the query processor 106 to assist in binding 112 and optimization 114 and to provide output rows in accordance with the TVF.

Some exemplary TVF operations contemplated in accordance with the present invention may include but are not limited to calculations to support hierarchical query operations such as XQuery, operations for managing type hierarchies in object-relational database systems, operations for efficiently performing translations of directory paths to and from internal paths for modeling a file system in a database system, and operations for producing a relational view over the results of a remote data source such as a web service.

The level of abstraction provided by the framework of the present invention enables arbitrary user defined extensions to be dynamically written in managed execution environment (MEE) 102 and integrated into the framework. This integration enables user-defined extensions to be evaluated by query processor 106 in the same manner as local extensions. Additionally, the user-defined extensions can be added dynamically to database server 104 without loss of capability.

Methods may be implemented in a native managed language of MEE 102 that can be used to satisfy the requirements specified by the information class 134 described above. These methods can be optionally implemented with default values for properties which are not explicitly provided. This allows arbitrary new methods to be added over time while maintaining backwards compatibility with previously implemented user-defined extensions that do not implement the new methods.

Other applications related to MEE's could include importing complex user-defined types (UDTs) from a persisted storage mechanism such as a flat file, tape device, or other secondary storage mechanism outside the database server 104. TVFs can also be used to validate UDTs as structurally correct when imported from outside the database server 104. Additionally, TVFs can even be used to expose complex metadata about UDTs in an MEE since TVF's can be used to display data of arbitrary structure by dynamically drilling down into the structure of a UDT.

Yet another benefit of TVF extensibility is hat TVF's provide the ability to expose more complex programming concepts within the relational model. Such complex programming concepts may include, for example, lists, dictionaries, arrays, collections, property bags. Such concepts generally involve grouping multiple objects into a single container for easier use in a programming language such as is made available by MEE extensibility.

Figure 4:
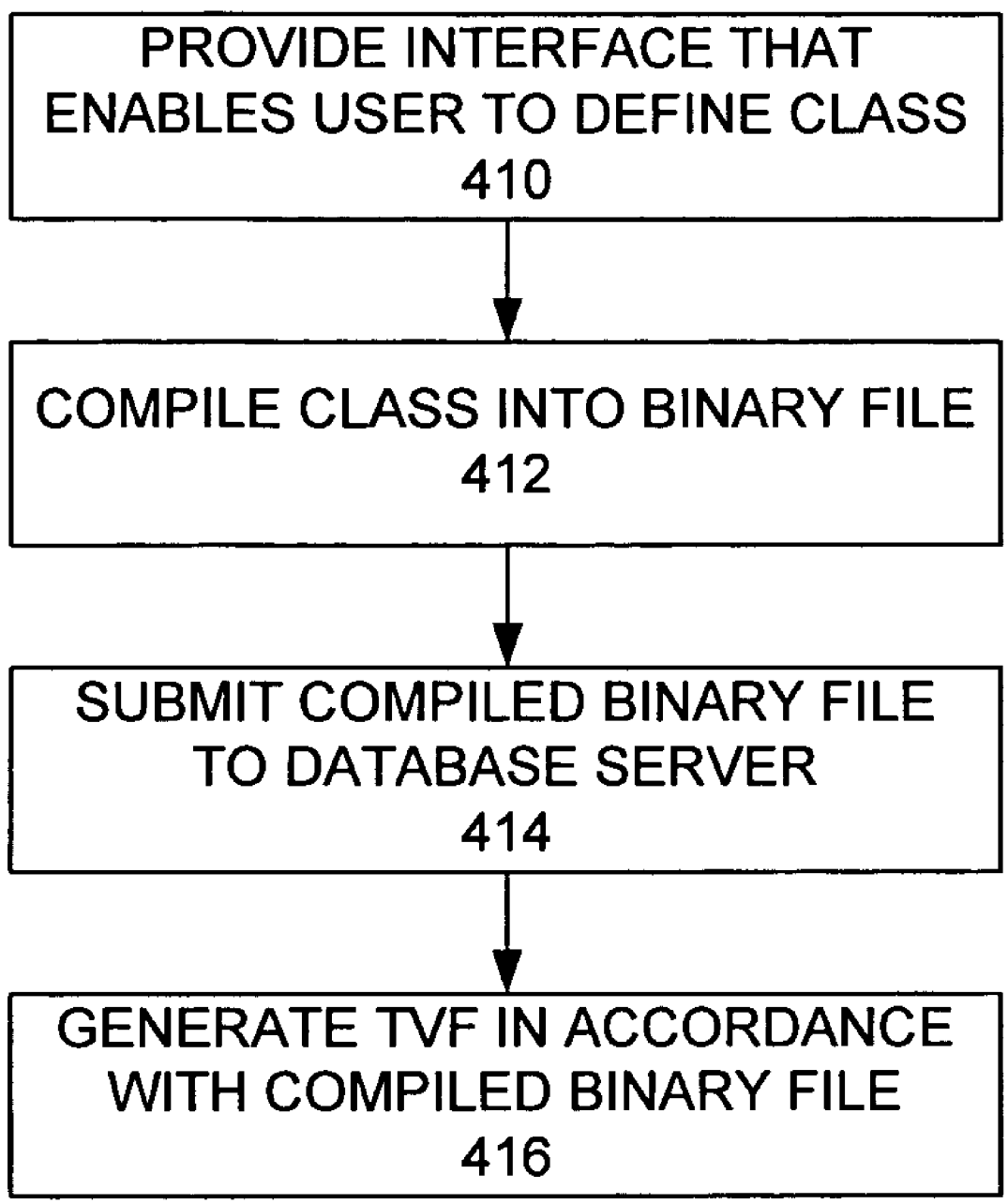
FIG. 4 is a flowchart of an exemplary method for TVF framework extensibility in accordance with the present invention.

A flowchart of an exemplary method for TVF framework extensibility in accordance with the present invention is shown in FIG. 4. At act 410, MEE 102 provides an interface that enables a user to define a class that describes the capabilities of a TVF. MEE 102 may provide, for example, a text editor interface that enables the user to define the class. An exemplary MEE class object is shown below:

```
Class MyTVF {
    public static IEnumerable MyTVF( ) { }
    // methods to supply "information object" properties
    Public SQLMetadata[ ]   GetOrderColumns( ) {// implementation}
    Public SQLMetadata[ ]   GetUniqueKeyColumns( ){//
implementation}
    // runtime methods
    Private static void     FillRow(object source,
ISqlUpdatableRecord record) {// implementation}
};
```

The exemplary class object above is defined in C#, however, a class object in accordance with the present invention may be defined in any language supported by MEE 102.

At act 412, the class is complied into a binary file, and, at act 414, the compiled binary file is submitted to database server 104. At act 416, a TVF is generated in accordance with the compiled binary file. Specifically, when implemented in connection with the TVF framework of FIG. 2, information class factory 132 may use the complied binary file to generate an information class 134 that describes the capabilities of a TVF invoked by incoming query 105.

Since it is implemented as an MEE object, the object code of the user-defined class can be interpreted by the database server 104 to query the compiled object code for associated metadata as part of its installation or use in the TVF framework. Thus, for example, an administrator need not supply additional information about the user-defined extension. Furthermore, database server 104 need not store additional metadata about the capabilities used in the resulting information class 134. When needed by the framework, the metadata can be queried dynamically by inspecting the compiled managed binary object file. Extensions to this concept may include, for example, copying the relevant metadata to a temporary location in the database server 104 for more efficient access. Additionally, the managed code may be copied into the data store 610, in the form of, for example, a .EXE or .DLL file, as a technique to maintain the metadata in a consistent state over the lifetime of a query plan.

Either through simple error or malicious intent, user-defined extensions may include metadata that does not correctly describe the properties of the TVF. The database server 104 can negate the risk of such incorrect metadata through various techniques. In one such technique, the supplied metadata is ignored if it cannot be proven as trusted information. In another technique, database server 104 may provide additional verification logic to an execution plan for a query that invokes the TVF. During execution, if the TVF does not behave as indicted, then an error message may be generated. For example, if a user-defined class indicates that a TVF returns sorted results, then query processor 106 may add special processing logic to verify whether the TVF output is indeed sorted. If the TVF fails to perform as indicated, then an error may be thrown, and the query may be aborted or recompiled and restarted ignoring the incorrect user-supplied metadata.

In addition to enabling the integration of user defined extensions, the framework enables the execution of a number of relational operations to be pushed into the execution of a TVF during optimization 114. Such relational operations may include, for example, Filter, Projection, and Grouping operations and other well defined relational operations. Pushing the execution of relational operations into the execution of a TVF results in improved query execution efficiency. For example, if a TVF is defined to return all of the elements in a hash table, a default implementation of the TVF would likely iterate over each hash bucket and return every element in a corresponding table. However, if the query restricts the hash table key column to a single value, then it is likely more efficient to encode this restriction into the TVF, thereby avoiding the work of enumerating all hash table entries.

Figure 5:
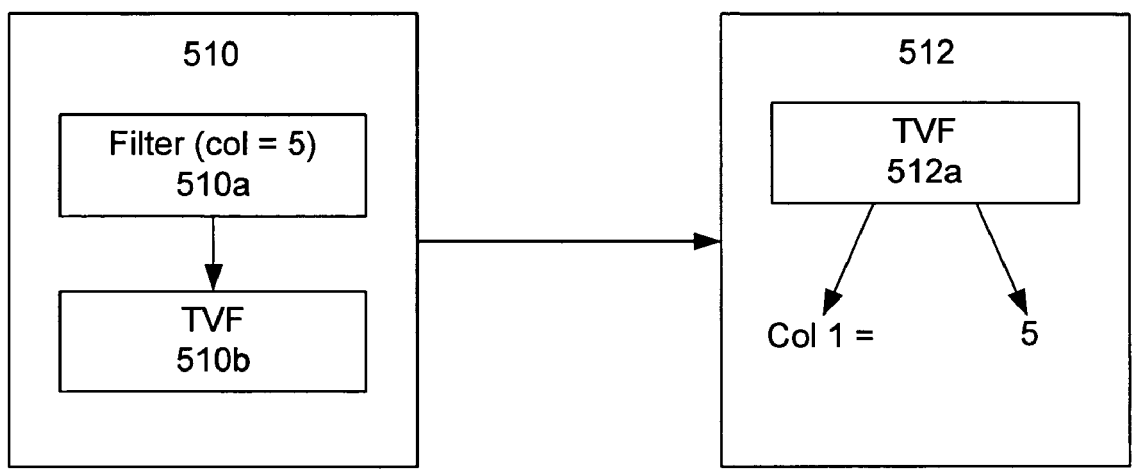
FIG. 5 is a block diagram showing an exemplary relational operation push down in accordance with the present invention.
Figure 6:
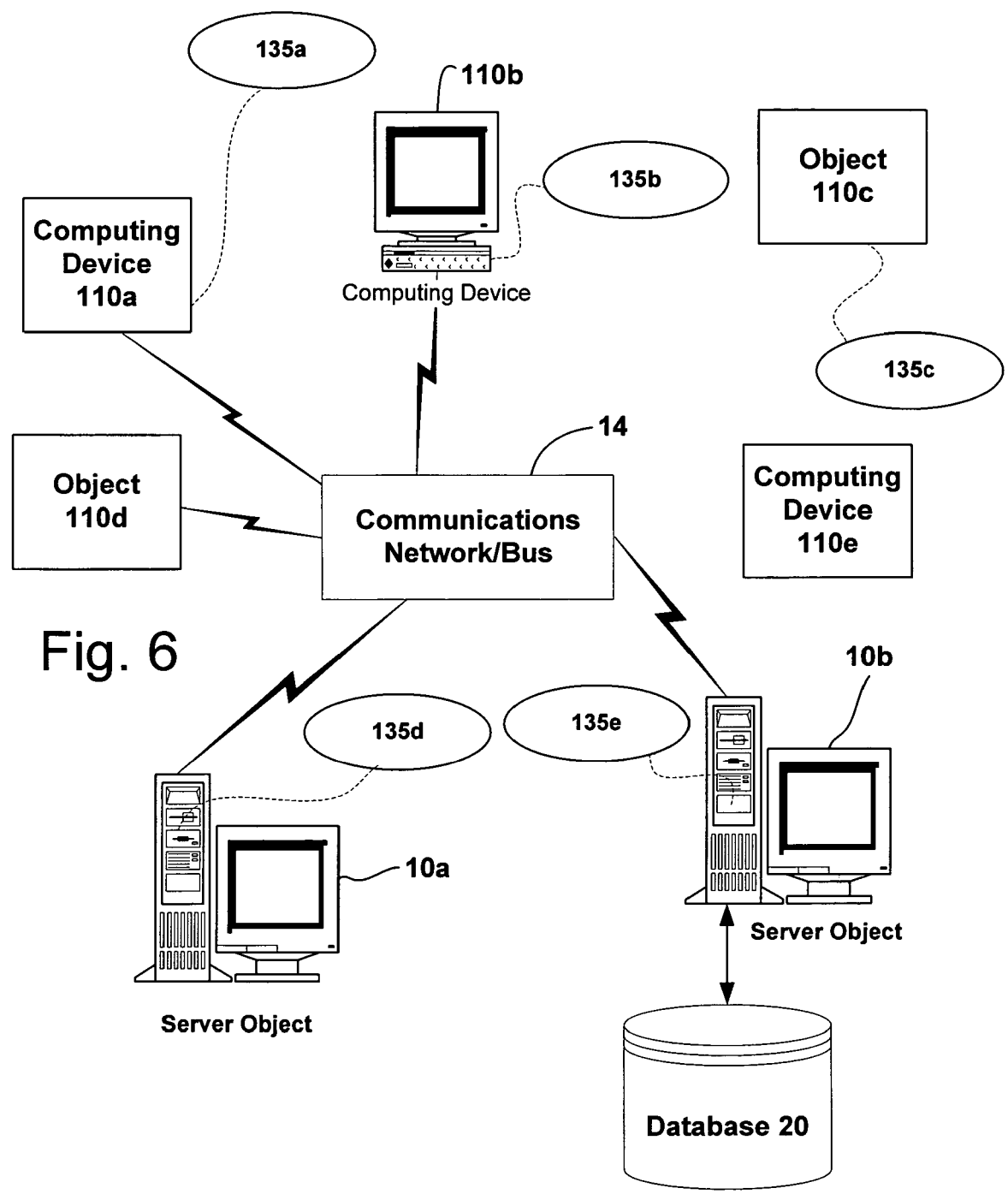
FIG. 6 is a block diagram representing an exemplary network environment having a variety of computing devices in which the present invention may be implemented.

FIG. 5 illustrates the concept of relational operation push down. Conventional query plan 510 includes a Filter operation 510*a*, which filters the first column of a data table to entries of five. Conventional query plan 510 also includes a TVF 510*b*. As shown, the Filter operation 510*a* is executed entirely separately from the TVF 510*b*. By contrast, in query plan 512, the filter operation is efficiently pushed down into the TVF 512a, thereby eliminating the need to enumerate all entries of the data table.

The relational operation push down may be achieved by encoding extra implicit arguments to the TVF. Such arguments pass additional instructions to the TVF, such as "filter on this column to this value", or "for this column, scan the range from 10 to 20". This technique can be used to pass restrictions on an arbitrary number of columns by supplying them in a well-defined order so that the TVF can interpret on which column the restriction is to be enforced.

The relational operation push down may also be achieved by generating separate run-time implementations for each pushed relational operation (or set of pushed relational operations). For example, a pushed filter could be implemented through a unique class to retrieve rows at runtime.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 7:
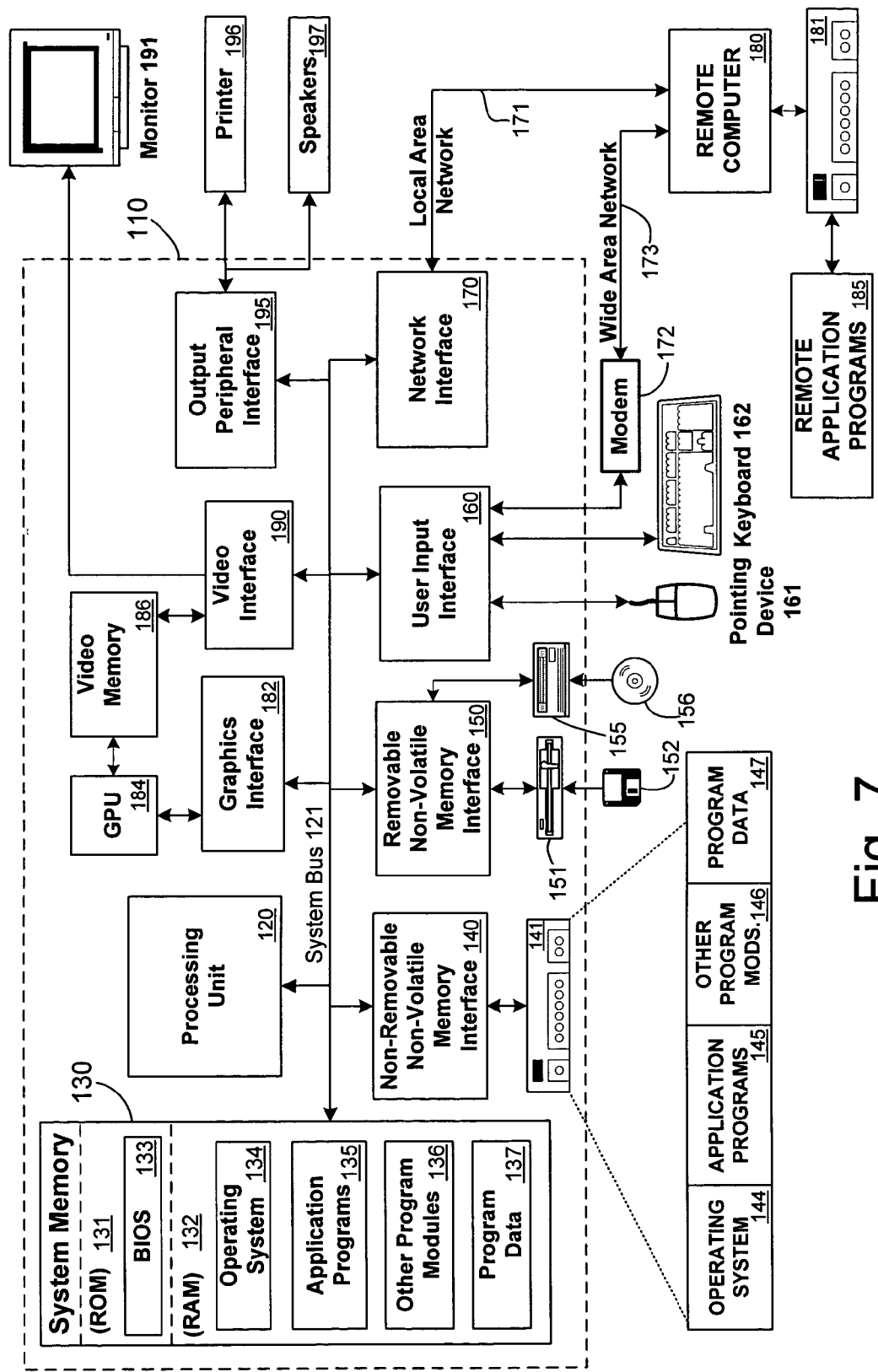
FIG. 7 is a block diagram representing an exemplary computing device in which the present invention may be implemented.

FIG. 7 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the sewer. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 7 illustrates an exemplary networked or distributed environment, with a sever in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 7 and the following discussion are intended to provide a brief general description of a suitable computing device in connection with which the invention may be implemented. For example, any of the client and server computers or devices illustrated in FIG. 7 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 8 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8 provide storage of computer readable instructions, data structures, program modules and other data for the computer 110. In FIG. 8, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

CONCLUSION

Thus, systems and methods for efficient evaluation of a query that invokes a table valued function (TVF) have been disclosed. The present invention provides a framework with desirable extensibility properties and the ability to minimize performance degradations by integrating tightly with the optimization infrastructure in a query processor. The present invention also enables managed execution environments, such as the Common-Language-Runtime (CLR), to efficiently and dynamically extend the logic of the database engine with user-supplied code.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for processing a query that invokes a table valued function to provide results, the method comprising:
    encoding by a computer processor at least one implicit argument in the table valued function, each of the at least one implicit argument passing instructions to execute at least one relational operation normally executed separately from the table valued function in the table valued function, wherein each relational operation is a filtering operation, a grouping operation or a projection operation, and a separate runtime implementation is generated for each relational operation;
    receiving a user defined class definition to instantiate a managed execution environment object;
    compiling the user defined class definition into binary code;
    storing the binary code at a database server;
    upon a request, querying the binary code to determine metadata regarding the user defined class, wherein the binary code may be interpreted by the database server based upon the managed execution environment object;
    receiving the query that invokes the table valued function;
    responsive to receiving the query, generating by a computer processor an information class that describes capabilities of the table valued function;
    querying by a computer processor the information class with a set of at least one binding questions regarding information about the table valued function comprising a number of columns that will be returned during query execution, types of columns, and/or names of the columns;
    querying by a computer processor the information class with a set of at least one optimization questions regarding information about the table valued function comprising whether rows are grouped on any set of columns, whether any columns make up a unique key, whether the table value function is deterministic or accesses external data sources and/or statistical information;
    executing by a computer processor the query in accordance with information provided in response to the set of binding questions and the set of optimization questions, wherein executing the query comprises:
        generating an execution class corresponding to the table valued function;
        requesting a set of data table rows as output from the execution class; and
        receiving the requested rows from the execution class.

2. The method of claim 1, comprising querying the information class with a set of optimization questions comprising a request for statistical information that includes one of a number of rows that will be returned for each invocation of the table valued function, a number of rows that will be returned for a range of parameter values, a number of duplicate values that will be returned for a set of columns, and a histogram describing a distribution of values that will be returned from the table valued function.

3. The method of claim 1, further comprising binding the query in accordance with information provided in response to the set of binding questions.

4. The method of claim 1, further comprising optimizing the query in accordance with information provided in response to the set of optimization questions.

5. The method of claim 1, wherein executing the query further comprises verifying the validity of the capabilities of the table valued function.

6. The method of claim 5, further comprising:
    determining that the capabilities of the table valued function are invalid; and aborting the execution of the query.

7. The method of claim 1, further comprising invoking the table valued function to provide calculations to support hierarchical query operations.

8. The method of claim 1, further comprising invoking the table valued function to provide translations of a directory path to model a file system in a database system.

9. The method of claim 1, further comprising invoking the table valued function to provide results from a remote data source.

10. A computer readable storage medium for processing a query that invokes a table valued function to provide results, the computer readable storage medium having stored thereon instructions executed by a computer that cause the computer to perform a process comprising:
    encoding at least one implicit argument in the table valued function, each of the at least one implicit argument passing instructions to execute at least one relational operation normally executed separately from the table valued function in the table valued function, wherein each relational operation is a filtering operation, a grouping operation or a projection operation, and a separate runtime implementation is generated for each relational operation;
    receiving a user defined class definition to instantiate a managed execution environment object;
    compiling the user defined class definition into binary code;
    storing the binary code at a database server;
    upon a request, querying the binary code to determine metadata regarding the user defined class, wherein the binary code may be interpreted by the database server based upon the managed execution environment object;
    receiving the query that invokes the table valued function;
    responsive to receiving the query, generating an information class that describes capabilities of the table valued function;
    querying the information class with a set of at least one binding questions regarding information about the table valued function comprising a number of columns that will be returned during query execution, types of columns, and/or names of the columns;

querying the information class with a set of at least one optimization questions regarding information about the table valued function comprising whether rows are grouped on any set of columns, whether any columns make up a unique key, whether the table valued function is deterministic or accesses external data sources and/or statistical information;

executing the query in accordance with information provided in response to the set of binding questions and the set of optimization questions, wherein executing the query comprises:

generating an execution class corresponding to the table valued function;

requesting a set of data table rows as output from the execution class; and receiving the requested rows from the execution class.

11. The computer readable storage medium of claim 10, wherein the statistical information includes one of a number of rows that will be returned for each invocation of the table valued function, a number of rows that will be returned for a range of parameter values, a number of duplicate values that will be returned for a set of columns, and a histogram describing a distribution of values that will be returned from the table valued function.

12. The computer readable storage medium of claim 10, wherein the process further comprises binding the query in accordance with information provided in response to the set of binding questions.

13. The computer readable storage medium of claim 10, wherein the process further comprises optimizing the query in accordance with information provided in response to the set of optimization questions.

14. The computer readable storage medium of claim 10, wherein executing the query further comprises verifying the validity of the capabilities of the table valued function.

15. The computer readable storage medium of claim 14, wherein the process further comprises:

determining that the capabilities of the table valued function are invalid; and aborting the execution of the query.

16. The computer readable storage medium of claim 10, wherein the process further comprises invoking the table valued function to provide calculations to support hierarchical query operations.

17. The computer readable storage medium of claim 10, wherein the process further comprises invoking the table valued function to provide translations of a directory path to model a file system in a database system.

18. The computer readable storage medium of claim 10, wherein the process further comprises invoking the table valued function to provide results from a remote data source.

19. A system for processing a query that invokes a table valued function to provide results comprising:

a processor;

a memory having stored thereon instructions executed by the processor that cause the processor to perform a process comprising:

encoding at least one implicit argument in the table valued function, each of the at least one implicit argument passing instructions to execute at least one relational operation normally executed separately from the table valued function in the table valued function, wherein each relational operation is a filtering operation, a grouping operation or a projection operation, and a separate runtime implementation is generated for each relational operation;

receiving a user defined class definition to instantiate a managed execution environment object;

compiling the user defined class definition into binary code;

storing the binary code at a database server;

upon a request, querying the binary code to determine metadata regarding the user defined class, wherein the binary code may be interpreted by the database server based upon the managed execution environment object;

receiving the query that invokes the table valued function;

responsive to receiving the query, generating an information class that describes capabilities of the table valued function;

querying the information class with a set of at least one binding questions regarding information about the table valued function comprising a number of columns that will be returned during query execution, types of columns, and/or names of the columns;

querying the information class with a set of at least one optimization questions regarding information about the table valued function comprising whether rows are grouped on any set of columns, whether any columns make up a unique key, whether the table valued function is deterministic or accesses external data sources and/or statistical information;

executing the query in accordance with information provided in response to the set of binding questions and the set of optimization questions, wherein executing the query comprises:

generating an execution class corresponding to the table valued function;

requesting a set of data table rows as output from the execution class; and receiving the requested rows from the execution class.

20. The system of claim 19, wherein the statistical information includes one of a number of rows that will be returned for each invocation of the table valued function, a number of rows that will be returned for a range of parameter values, a number of duplicate values that will be returned for a set of columns, and a histogram describing a distribution of values that will be returned from the table valued function.

21. The system of claim 19, wherein the process further comprises binding the query in accordance with information provided in response to the set of binding questions.

22. The system of claim 19, wherein the process further comprises optimizing the query in accordance with information provided in response to the set of optimization questions.

23. The system of claim 19, wherein executing the query further comprises verifying the validity of the capabilities of the table valued function.

24. The system of claim 23, wherein the process further comprises:

determining that the capabilities of the table valued function are invalid; and aborting the execution of the query.

25. The system of claim 19, wherein the process further comprises invoking the table valued function to provide calculations to support hierarchical query operations.

26. The system of claim 19, wherein the process further comprises invoking the table valued function to provide translations of a directory path to model a file system in a database system.

27. The system of claim 19, wherein the process further comprises invoking the table valued function to provide results from a remote data source.

* * * * *